United States Patent [19]

Nakahara et al.

[11] Patent Number: 4,680,355

[45] Date of Patent: Jul. 14, 1987

[54] PROCESS FOR PREPARATION OF FLUORINE CONTAINING POLYMER FILMS

[75] Inventors: Akihiko Nakahara, Kumage; Kuniaki Takata; Yuji Iseki, both of Tokuyama, all of Japan

[73] Assignee: Tokuyama Soda Kabushiki Kaisha, Yamaguchi, Japan

[21] Appl. No.: 891,060

[22] Filed: Jul. 31, 1986

Related U.S. Application Data

[63] Continuation of Ser. No. 710,851, Mar. 12, 1985, abandoned.

[30] Foreign Application Priority Data

Mar. 12, 1984 [JP] Japan .................................. 59-45398
Mar. 22, 1984 [JP] Japan .................................. 59-53499

[51] Int. Cl.$^4$ .............................................. B05D 3/02
[52] U.S. Cl. ..................................... 526/243; 526/242; 521/27; 264/83; 264/DIG. 57; 427/231; 427/257; 427/377; 427/385.5; 428/421

[58] Field of Search ................... 521/27, 29; 427/377, 427/385.5, 231, 257; 264/83, 216, DIG. 57; 526/243, 245; 428/265; 156/242

[56] References Cited

U.S. PATENT DOCUMENTS

| | | | |
|---|---|---|---|
| 3,669,825 | 6/1972 | Hall | 156/307.3 X |
| 3,930,064 | 12/1975 | Sanders | 427/385.5 X |
| 4,211,742 | 7/1980 | Kato et al. | 264/216 |
| 4,217,198 | 8/1980 | Kadija et al. | 427/385.5 X |
| 4,329,434 | 5/1982 | Kimoto et al. | 526/243 X |
| 4,472,480 | 9/1984 | Olson | 427/385.5 X |
| 4,615,943 | 10/1986 | Sakagami et al. | 264/216 X |

Primary Examiner—Joesph L. Schoter
Assistant Examiner—F. M. Teskin
Attorney, Agent, or Firm—Sherman and Shalloway

[57] ABSTRACT

A fluorine-containing polymer film is prepared by flow-casting a fluorine-containing vinyl monomer, which is liquid under polymerization conditions, in the form of a film having a thickness of up to 1 mm and polymerizing the flow-cast monomer.

18 Claims, 2 Drawing Figures

PROCESS FOR PREPARATION OF FLUORINE CONTAINING POLYMER FILMS

This application is a continuation of application Ser. No. 710,851, filed Mar. 12, 1985, now abandoned.

BACKGROUND OF THE INVENTION (1) Field of the Invention

The present invention relates to a process for the preparation of fluorine-containing polymer films, in which a fluorine-containing polymer film is formed simultaneously with polymerization of a fluorine-containing monomer. More particularly, the present invention relates to a process suitable for the production of a film of a perfluorocarbon type polymer having a crosslinked structure.

(2) Description of the Prior Art

Since violent generation of heat is caused in polymerization for the production of fluorine-containing polymers, that is, polymers (inclusive of copolymers; the same will apply hereinafter) of vinyl monomers having at least one fluorine atom in the molecule, bulk polymerization is not ordinarily carried out but suspension polymerization or emulsion polymerization using a liquid medium is ordinarily adopted.

Since a fluorine-containing olefin having 2 to 3 carbon atoms, such as tetrafluoroethylene, is gaseous under polymerization conditions, polymerization of this olefin is ordinarily carried out in the liquid phase by bubbling the olefin in a dispersion medium such as water or in the presence of a solvent.

Each of fluorine-containing polymers prepared according to these known processes is ordinarily in the powdery form or granular form. Accordingly, a fluorine-containing polymer film has heretofore been prepared by heating the obtained polymer in the powdery state, or after pelletizing, to form a melt or gel having a mutual adhesiveness and extrusion-molding and/or calendering the melt or gel to form a film.

In this conventional technique, the step of polymerizing a monomer and the step of forming the polymer into a film are indispensable. Moreover, in the case of a perfluorocarbon type polymer, the melting temperature is ordinarily high and large quantities of heat and mechanical energy are necessary for melt molding. Furthermore, since a surface active agent, a suspending agent such as a salt, an emulsifier, a suspension stabilizer and the like are used for polymerization of a fluorine-containing vinyl monomer, these chemicals adhere to the formed polymer and are contained as impurities. These chemicals are discolored under heating at the step of molding the fluorine-containing polymer, and it often happens that undesirable coloration is caused in the obtained fluorine-containing polymer film.

In the case where a fluorine-containing polymer is used in a special field, for example, as a material for the medical treatment, dissolution of impurities, such as those mentioned above, often violates stipulations of the medical standards.

In the case where a melt or gel formed by heating is molded, the starting polymer should be thermoplastic. It is substantially impossible to obtain a film having a dimension stability improved by crosslinking from a thermoplastic polymer.

SUMMARY OF THE INVENTION

It is therefore a primary object of the present invention to provide a process for the preparation of fluorine-containing polymer films, in which a fluorine-containing polymer film, especially a fluorine-containing polymer film capable of selectively absorbing or transporting a specific ion or molecule, the use of which has been recently expanded, can be easily obtained.

Another object of the present invention is to provide a process in which a fluorine-containing polymer film is prepared by a one step process.

Still another object of the present invention is to provide a process for the preparation of a fluorine-containing polymer film which has a much reduced impurity content and hence, is stable against heat and various solvents.

Still another object of the present invention is to provide a process for the preparation of a fluorine-containing polymer film having a crosslinked structure. This fluorine-containing polymer film having a crosslinked structure has a high dimension stability and is advantageously used in various fields. Especially, a crosslinked perfluorocarbon polymer containing ion-exchange groups of a capacity of 0.1 to 2 meq/g of the resin is very valuable as a membrane for use in the process for obtaining valuable chemicals such as chlorine, caustic soda and others by electrolytic oxidation and/or reduction of aqueous solutions of salts such as sodium chloride or organic compounds.

Still another object of the present invention is to provide a process for the preparation of fluorine-containing polymer films, in which a fluorine-containing polymer film having a laminar structure including a plurality of layers parallel to the surface of the film, which are different in their properties, can be prepared. According to this process, there can be obtained a multi-layer membrane including layers having a thickness of about 10μ to about 1 mm, in which every two adjacent layers are very tightly bonded in the boundary and peeling is not caused, and a membrane having a multi-layer structure in which the boundary between every two adjacent layers is not definite and the property or chemical structure can be gradually changed from one side to the other side.

A further object of the present invention is to provide a process for preparing a fluorine-containing polymer film having on the surface thereof many convexities and concavities having a height or depth of several microns to scores of microns, which is especially valuable as an ion-exchange membrane.

In accordance with the present invention, there is provided a process for the preparation of fluorine-containing polymer films, which comprises flow-casting a fluorine-containing vinyl monomer, which is liquid under polymerization conditions, in the form of a film having a thickness of up to 1 mm and polymerizing the flow-cast monomer.

Other objects and characteristic features of the present invention will become apparent from the following description.

DETAILED DESCRIPTION OF THE PREFERRED EMBODIMENTS

In the instant specification and appended claims, the term "film" is used to mean not only ordinary films but also so-called membranes and diaphragms. Namely, filmy products having a thickness of $10\mu$ to several millimeters are meant by the term "film", and these filmy products integrated with reinforcers such as fabrics are included.

By the term "fluorine-containing vinyl monomer" is meant a compound having at least one polymerizable carbon-to-carbon double bond and at least one hydrogen atom substituted with a fluorine atom in the molecule. By the term "fluorine-containing olefin" is meant an olefin having 2 to 3 carbon atoms and at least one hydrogen atom substituted with a fluorine atom, which is included in the scope of a fluorine-containing vinyl monomer.

By the term "fluorine-containing polymer" is meant a polymer of a fluorine-containing vinyl monomer.

The most important characteristic feature of the present invention resides in that a fluorine-containing vinyl monomer, which is liuqid under polymerization conditions, is flow-cast in the form of a film having a thickness of up to 1 mm and is then polymerized. More specifically, it is important that when the above-mentioned monomer is flow-cast in the form of a film, one surface of the film should be kept in contact with the gas phase, that is, one surface of the film should be a free liquid surface. In this point, the process of the present invention is substantially different from the conventional cast polymerization process using a mold.

In the present invention, polymerization of the fluorine-containing vinyl monomer, which is liquid under polymerization conditions, is carried out in the absence of any medium. Namely, if the vinyl monomer is flow-cast in the form of a film having a thickness of up to 1 mm and polymerization is carried out in the state where one surface is released and kept in contact with the gas phase, the polymerization heat can be easily removed. Accordingly, the polymerization state can be easily controlled and the deformation of the film that is readily generated in bulk polymerization is hardly caused.

In the present invention, the method of flow-casting the fluorine-containing vinyl monomer is not particularly critical, but adoption of the following methods is recommended.

(a) A method in which a fluorine-containing vinyl monomer is flow-cast on a flat plate horizontally arranged, such as a glass or metal plate.

(b) A method in which a fluorine-containing vinyl monomer is flow-cast on the surface of a liquid which has a specific gravity larger than that of the vinyl monomer and is immiscible with the vinyl monomer, such as mercury.

(c) A method in which a fluorine-containing vinyl monomer is supplied to a rotary cylindrical reaction vessel and the rotary cylinder is rotated to flow-cast the vinyl monomer in the form of a film.

According to these methods, a liquid fluorine-containing vinyl monomer is flow-cast in the form of a film having a thickness of at least $1\mu$. However, if the thickness of the flow-cast film is too small, partial breakage is readily caused and it is apprehended that defects such as pinholes will be formed in the obtained film. Accordingly, in the present invention, it is indispensable that the liquid fluorine-containing monomer should be flow-cast in the form of a film having a thickness of at least $10\mu$.

Among the foregoing casting methods, the method (a) is simplest, but a flat plate should be kept horizontal and if the affinity between the vinyl monomer and the flat plate is not good, liquid breakage is readily caused. Accordingly, the method (a) is not suitable for the production of a film having such a large area as exceeding 1 $m^2$. The method (b) is advantageous in that a horizontal surface can be formed very easily and a film having a large area is readily obtained. However, the vapor pressure of the liquid used cannot be neglected and it is sometimes difficult to select an appropriate liquid. In the method (c), in the case where the rotation axis passing through the center of the circular section and extending in the direction vertical to said section is arranged in the horizontal direction and the reaction vessel is rotated in this state, the vinyl monomer supplied into the reactor is partially raised up along the inner wall of the reaction vessel by rotation of the cylinder, whereby a film is formed on the inner wall. In this state, polymerization is advanced in the film and the viscosity is increased, and hence, a filmy polymer having a substantially uniform thickness is formed on the inner wall of the cylinder. In order to obtain this state, it is ordinarily preferred that the rotation rate of the cylinder be at least 10 rpm, and good results are ordinarily obtained if the rotation speed is up to 500 rpm. In the case where the rotation speed is higher than 500 rpm, the direction of the rotation axis of the cylindrical reaction vessel need not be taken into consideration any more and the vinyl monomer can be flow-cast in a uniform thickness along the inner wall of the reaction vessel by the centrifugal force generated by rotation. In this case, however, the energy necesssary for rotation is increased and connection to various accessory devices should be taken into consideration. Accordingly, the most preferred method for flow-casting and polymerizing the fluorine-containing vinyl monomer in the present invention is a method which comprises supplying a fluorine-containing monomer, which is liquid under polymerization conditions, into a rotary cylindrical reaction vessel, rotating the reaction vessel, preferably while arranging the rotation axis of the reaction vessel in the horizontal direction, to form a film having a thickness of up to 1 mm, especially $10\mu$ to 1 mm, along the inner wall of the reaction vessel, and polymerizing the vinyl monomer.

In the present invention, kind of the vinyl monomer which is liquid under polymerization conditions is not particularly critical. A fluorine-containing vinyl monomer having a functional group or being free of a functional group may be used according to the intended use of the obtained film. For example, the fluorine-containing vinyl monomer may be selected from monomers represented by the following general formula:

wherein l and p are 0 or 1, m, n, r and q stand for an integer of from 0 to 4, X and X' stand for F, H, Cl or —$CF_3$, and Y stands for —$SO_2$—A (in which A stands for OM (M is $H^+$ or a metal ion), F, Cl or Br), —COB (in which B stands for A or OR (R is an alkyl group such as methyl or ethyl) ), —CN, —CF$_3$ or —CF=CF$_2$.

As specific examples of the fluorine-containing vinyl monomer of the above general formula that can be used in the present invention, there can be mentioned fluorine-containing vinyl monomers having a functional group that can be easily converted to an ion-exchange group such as —SO$_3$H or —COOH, for example, fluorine-containing vinyl ether sulfonyl halides such as

CF$_2$=CFOCF$_2$CF$_2$SO$_2$F,
CF$_2$=CFOCF$_2$CF$_2$CF$_2$SO$_2$F, $$CF_2=CFOCF_2\overset{\overset{\displaystyle CF_3}{|}}{C}FOCF_2CF_2SO_2F,$$

$$CF_2=CFOCF_2\overset{\overset{\displaystyle CF_3}{|}}{C}FOCF_2\overset{\overset{\displaystyle CF_3}{|}}{C}FOCF_2CF_2SO_2F,$$

CF$_2$=CFOCF$_2$CF$_2$SO$_2$Cl,
CF$_2$=CFOCF$_2$CF$_2$CF$_2$SO$_2$Cl and $$CF_2=CFOCF_2\overset{\overset{\displaystyle CF_3}{|}}{C}FOCF_2CF_2SO_2Cl,$$

fluorine-containing vinyl ether carboxylic acid esters such as

CF$_2$=CFOCF$_2$COOCH$_3$,
CF$_2$=CFOCF$_2$COOCH$_2$CH$_3$,
CF$_2$=CFOCF$_2$CF$_2$COOCH$_3$,
CF$_2$=CFOCF$_2$CF$_2$COOCH$_2$CH$_3$,
CF$_2$=CFOCF$_2$CF$_2$CF$_2$COOCH$_3$
CF$_2$=CFOCF$_2$CF$_2$CF$_2$COOCH$_2$CH$_3$,
CF$_2$=CFOCF$_2$CF$_2$CF$_2$CF$_2$COOCH$_3$,
CF$_2$=CFOCF$_2$CF$_2$CF$_2$CF$_2$COOCH$_2$CH$_3$, $$CF_2=CFOCF_2\overset{\overset{\displaystyle CF_3}{|}}{C}FOCF_2CF_2COOCH_3,$$

$$CF_2=CFOCF_2\overset{\overset{\displaystyle CF_3}{|}}{C}FOCF_2CF_2COOCH_2CH_3,$$

$$CF_2=CFOCF_2\overset{\overset{\displaystyle CF_3}{|}}{C}FOCF_2CF_2CF_2COOCH_3,$$

$$CF_2=CFOCF_2\overset{\overset{\displaystyle CF_3}{|}}{C}FOCF_2CF_2CF_2COOCH_2CH_3,$$

$$CF_2=CFO\overset{\overset{\displaystyle CF_3}{|}}{C}FCOOCH_3,$$

$$CF_2=CFO\overset{\overset{\displaystyle CF_3}{|}}{C}FCOOCH_2CH_3,$$

CF$_2$=CHCOOCH$_2$CF$_3$ and
CH$_2$=CHCH$_2$OOCCF$_2$CF$_3$, fluorine-containing vinyl ether carboxylic acid halides such as

CF$_2$=CFOCF$_2$COF,
CF$_2$=CFOCF$_2$CF$_2$COF,
CF$_2$=CFOCF$_2$CF$_2$CF$_2$COF, $$CF_2=CFOCF_2\overset{\overset{\displaystyle CF_3}{|}}{C}FOCF_2COF,$$

CF$_2$=CFOCF$_2$COCl and $$CF_2=CFOCF_2\overset{\overset{\displaystyle CF_3}{|}}{C}FOCF_2\overset{\overset{\displaystyle CF_2}{|}}{C}FOCF_2CF_2COCl,$$

and fluorine-containing vinyl ether nitiles such as

CF$_2$=CFOCF$_2$CF$_2$CN,
CF$_2$=CFOCF$_2$CF$_2$CF$_2$CN, $$CF_2=CFOCF_2\overset{\overset{\displaystyle CF_3}{|}}{C}FOCF_2CF_2CN \text{ and}$$

$$CF_2=CFOCF_2\overset{\overset{\displaystyle CF_3}{|}}{C}FOCF_2CF_2CF_2CN,$$

fluorine-containing monovinyl monomers, for example, fluorine-containing alkyl vinyl ether compounds such as

CF$_2$=CFOCF$_2$CF$_2$OCF$_2$CF$_3$,
CF$_2$=CFOCF$_2$CF$_2$CF$_3$, $$CF_2=CFOCF_2\overset{\overset{\displaystyle CF_3}{|}}{C}FOCF_2CF_3,$$

$$CF_2=CFOCF_2\overset{\overset{\displaystyle CF_3}{|}}{C}FOCF_2\overset{\overset{\displaystyle CF_3}{|}}{C}FOCF_2CF_3 \text{ and}$$

CF$_2$=CFOCF$_2$CF$_2$CF$_2$OCF$_2$CF$_3$, and fluorine-containing unsaturated compounds such as CF$_2$=CFCF$_2$CF$_2$CF$_3$, CF$_2$=CFCF$_2$CF(CF$_3$)$_2$ and CF$_2$=CFCF$_2$C(CF$_2$)$_3$, and fluorine-containing polyvinyl monomers, for example, fluorine-containing divinyl compounds such as
CF$_2$=CFCF=CF$_2$,
CF$_2$=CFCF$_2$CF=CF$_2$,
CF$_2$=CFOCF$_2$CF$_2$OCF=CF$_2$,
CF$_2$=CFOCF$_2$CF$_2$CF$_2$OCF=CF$_2$ and
CF$_2$=OCFOCF$_3$CF$_2$OCF$_2$CF$_2$OCF=CF$_2$.

Of course, fluorine-containing vinyl monomers that can be used in the present invention are not limited to those exemplified above. Ordinarily, unsaturated compounds having up to about 15 carbon atoms (exclusive of carbon atoms of ester or cyano groups), especially up to 10 carbon atoms, are used. In the present invention, films of copolymers of two or more of these compounds can optionally be prepared.

In the present invention, polymerization is effected according to known polymerization-initiating means.

The process of the present invention is especially preferred when it is intended to obtain a polymer in which the main chain is a so-called perfluorocarbon chain where hydrogen atoms of the carbon chain are substituted with fluorine atoms.

As specific means for initiating polymerization, there can be mentioned addition of a radical polymerization initiator and irradiation with ionizing radiations such as ultraviolet rays, α-rays, β-rays, γ-rays and X-rays. These initiating means may be adopted in combination. Ordinarily, it is preferred that polymerization be initiated by using a radical initiator. The initiator is used in the state where the initiator is dissolved in the fluorine-containing vinyl monomer in an amount necessary for polymerization of the vinyl monomer (ordinarily, about 0.1 to about 10 mole% based on the fluorine-containing vinyl monomer which is liquid under polymerization conditions).

Polymerization is initiated by decomposing the radical initiator by heating. It is ordinarily preferred that polymerization be conducted at a temperature where the amount of the initiator used is reduced to ½ within 10 hours.

As preferred examples of the radical initiator, there can be mentioned perfluorodiacyl peroxides such as perflurodipropanoyl peroxide, perfluorodibutanoyl peroxide and perfluorodipentanoyl peroxide, perfluorodiacyl peroxides in which H or Cl is present at the ω-position, and peroxides having a prefluoroalkyl group containing an ether group therein, such as perfluorodipropoxypropionyl peroxide. Furthermore, there may be used nitrogen fluorides such as $N_2F_4$ and $CF_3—C(NF_2)=C(NF_2)—CF_3$, and hydrocarbon type diacyl peroxides according to need.

The reaction temperature is selected according to the kind of radical initiator or ionizing radiation used, but the reaction temperature is ordinarily about 10° to about 120° C. When a radical initiator is used, it is preferred that the reaction temperature be about 20° to about 100° C.

Another characteristic feature of the present invention is that when a fluorine-containing vinyl monomer which is liquid under polymerization conditions is flow-cast in a thickness of up to 1 mm and polymerized, a fluorine-containing olefin, preferably a perfluoro-olefin, is made present in the gas phase contacted with the flow-cast monomer.

In this case, a part of the fluorine-containing olefin present in the gas phase is dissolved in the flow-cast liquid monomer. In the present invention, since the liquid fluorine-containing vinyl monomer is flow-cast in a thickness of up to 1 mm, the fluorine-containing olefin supplied from the gas phase is homogeneously dispersed in the liquid monomer. Namely, if the thickness of the flow-cast liquid monomer is too large, as the viscosity is increased during polymerization, diffusion of the fluorine-containing olefin supplied from the gas phase becomes insufficient and the obtained polymer is heterogeneous and deformed.

Of course, the amount of the gaseous fluorine-containing olefin dissolved in the fluorine-containing vinyl monomer which is liquid under polymerization conditions is determined according to the partial pressure of the olefin in the gas phase. Therefore, the ratio of the fluorine-containing olefin to be copolymerized in the obtained fluorine-containing polymer can be adjusted by controlling the partial pressure of the fluorine-containing olefin in the gas phase. When this partial pressure is changed with the lapse of time during polymerization, there can be obtained a film in which the content of the fluorine-containing olefin is continuously changed in the thickness direction of the film.

In some case, the thickness of the film is increased to some extent by diffusion of the fluorine-containing olefin supplied from the gas phase.

The method of making the fluorine-containing olefin present in the gas phase is not particularly critical. For example, the total gas pressure may be formed only by the fluorine-containing olefin, or an inert gas such as nitrogen may be present in the gas phase so that a certain partial pressure of the fluorine-containing olefin is produced. The partial pressure of the fluorine-containing olefin (inclusive of the case where the total pressure of the gas phase is occupied by the pressure of the fluorine-containing olefin; the same will apply hereinafter) may be atmospheric pressure, elevated pressure or reduced pressure, but ordinarily, the partial pressure of the fluorine-containing olefin is 0.1 to 200 kg/cm² (absolute). The higher the pressure is, the higher the fluorine content is in the obtained fluorine-containing polymer film. Furthermore, since the viscosity of the flow-cast film is increased with the advance of polymerization, the content of the fluorine-containing olefin absorbed in the film is gradually increased toward the surface.

Another advantage attained by carrying out polymerization while supplying the fluorine-containing olefin from the gas phase is that convexities and concavities having a height or depth of several microns to scores of microns are entirely formed on the olefin-contacting surface of the obtained polymer film. By dint of this feature, the peel strength of a laminar film described hereinafter can be increased, and when the film obtained according to this embodiment is used as a diaphragm in the process for the electrolysis of an aqueous solution of sodium chloride, especially as an ion-exchange membrane in the ion-exchange membrane process for the electrolysis of an aqueous solution of sodium chloride, an effect of preventing adhesion of bubbles can be attained.

In order to form such convexities and concavities on the surface of the polymer film, it is preferred that the partial pressure of the fluorine-containing olefin be adjusted to 0.1 to 200 kg/cm² (absolute), especially 0.5 to 20 kg/cm² (absolute). As the fluorine-containing olefin, there can be mentioned tetrafluoroethylene, chlorotrifluoroethylene, vinylidene fluoride and hexafluoropropylene. Tetrafluoroethylene is especially preferred because it is easily absorbed in the liquid fluorine-containing vinyl monomer and is easily copolymerized therewith.

The fluorine-containing olefin content in the fluorine-containing polymer obtained by carrying out polymerization in the presence of the fluorine-containing olefin in the gas phase depends on the amount of the fluorine-containing olefin supplied from the gas phase, but it is ordinarily preferred that the amount of the fluorine-containing olefin in the obtained polymer be 5 to 95 mole%, especially 30 to 95 mole%.

Still another characteristic feature of the present invention is that a fluorine-containing polymer film having a crosslinked structure can be easily obtained. More specifically, when a fluorine-containing polyvinyl monomer such as a fluorine-containing divinyl or trivinyl monomer is singly used as the fluorine-containing vinyl monomer which is liquid under polymerization conditions, or when a plurality of fluorine-containing vinyl monomers which are liquid under polymerization conditions are used and at least one of them is a fluorine-containing polyvinyl monomer, a film of a fluorine-containing polymer having a crosslinked structure can be obtained.

The crosslinking degree of the olefin-containing polymer is determined by the proportion of the fluorine-containing polyvinyl monomer in the liquid monomer used and the partial pressure of the fluorine-containing olefin made present according to need. In order to improve the dimension stability of the obtained film, it is preferred that the fluorine-containing polyvinyl monomer be copolymerized in an amount of 1 to 60 mole%, especially 5 to 40 mole%.

Still another characteristic feature of the present invention is that there can be obtained a fluorine-containing polymer film having a multi-layer structure having a plurality of layers which are arranged in parallel to the film surface and are physically or chemically different from one another.

As the basic means for obtaining a multi-layer film, there can be mentioned a method in which a fluorine-containing vinyl monomer which is liquid under polymerization conditions is flow-cast and polymerization is carried out, if necessary in the presence of a gaseous fluorine-containing olefin, and when a solid film is thus formed or when the viscosity is increased to such an extent that the cast film is not easily mingled with another monomer supplied thereon, a different monomer is supplied, flow-cast on the polymerized film and then polymerized. Of course, it is preferred that a radical polymerization initiator be incorporated in the newly supplied fluorine-containing vinyl monomer. According to the above-mentioned method, there can be obtained a fluorine-containing polymer film having a two-layer structure. If the so-obtained polymer film having a two-layer structure is not withdrawn from the polymerization vessel and still another liquid fluorine-containing vinyl monomer is supplied on the two-layer film and is then polymerized, a polymer film having a three-layer structure can be obtained. If the above procedures are repeated, a polymer film having a desired number of layers can be obtained. Of course, there may be adopted a modification in which a fluorine-containing vinyl monomer is used for a certain layer alone or a fluorine-containing vinyl monomer having an ion-exchanged group is used for a specific layer.

In the multi-layer film obtained according to the present invention, the polymers constituting the respective layers are partially graft-crosslinked, and interlaminar peeling is hardly caused. Particularly in the case where polymerization is carried out while supplying a fluorine-containing olefin from the gas phase, since convexities and concavities having a height or depth of several microns to scores of microns are entirely formed on the surface of the film as the base, there can be obtained a multi-layer film in which a mechanically anchoring effect is produced between the base film and a newly formed film (layer) and peeling is seldom caused.

Modifications and variations that those skilled in the art can easily understand and work may be made to the above-mentioned basic embodiments of the present invention. For example, an antioxidant, an ultraviolet absorber, other stabilizer, a pigment, an inorganic or organic powdery filler or a fibrous reinforcer may be incorporated into the fluorine-containing vinyl monomer which is liquid under polymerization conditions, so far as polymerization of the vinyl monomer is not inhibited. In case of a perfluorocarbon type polymer film, it is often preferred that the polymer film be reinforced with a fibril, yarn, net, cloth or woven fabric composed of polytetrafluoroethylene or a tetrafluoroethyleneperfluoroalkyl vinyl ether copolymer.

Films of the present invention prepared according to the above-mentioned embodiments and modifications can be broadly used in various fields. For example, these films can be used as diaphragms for the electrolysis of an aqueous solution of sodium chloride, diaphragms for hemodialysis and diaphragms for industrial diffusion dialysis. Moreover, the film of the present invention can be used as a surface-covering film for imparting a chemical resistance. Films in which the capacity of ion-exchange groups is different between the surface portion and the interior portion, composite films containing carboxyl groups on one surface and sulfonic acid groups on the other surface, and perfluorocarbon type composite films having an ion-exchange capacity of 0.1 to 2 meq/g of the resin, in which carboxyl groups are present in the surface portion having a thickness of several microns to scores of microns and sulfonic acid groups are present in the other portion, are very important as ion-exchange membranes in the chlorine-alkali industry. These films can be obtained very easily according to the present invention. In order to obtain these valuable films, it is important that convexities and concavities having a height or depth of several microns to scores of microns should be formed on the surface and/or the film-constituting polymer should have a crosslinked structure.

Moreover, in keeping with proposals made heretofore in the field of ion-exchange membranes for the electrolysis on the constituent monomers, the desired ion-exchange groups and the physical and chemical structures can be advantageously realized very easily according to the present invention. For example, membranes disclosed in Japanese Patent Application Laid-Open Specifications No. 24177/77, No. 58374/82 and No. 34805/83 can be obtained very easily according to the present invention.

Furthermore, in the present invention, if a rotary cylindrical polymerization vessel is used, a cylindrical film can be obtained. Therefore, a seamless tubular ion-exchange membrane, which cannot be obtained according to the conventional technique, can be advantageously prepared according to the present invention. For example, tubular ion-exchange membranes ranging from fine tubes having a diameter of about 5 mm to larger tubular membranes having a diameter of several meters can be prepared according to the present invention.

The present invention will now be described in detail with reference to the following examples that by no means limit the scope of the invention.

EXAMPLE 1

A 5% solution of a compound of the following formula:

in Freon 113 (Tradename) was charged as a radical initiator in a glass cylinder having an inner diameter of 1.6 cm and a length of 10 cm, the inlet of which was throttled so that when the cylinder was kept horizontal, a liquid in the cylinder did not flow out. The amount of the radical initiator was 1 mole% based on the starting fluorine-containing vinyl monomer of the following formula:

Then, the Freon 113 solution was cooled to $-5°$ C. and the pressure was reduced to evaporate Freon 113 as the solvent. Under cooling, the pressure was restored to the atmospheric pressure, and about 1.4 g of the starting fluorine-containing vinyl monomer of the above formula was added. The glass cylinder was inserted in a cylindrical stainless steel reaction vessel so that the rotation axis of the glass cylinder was in agreement with that of the reaction vessel. The reaction vessel was cooled with liquefied air and the pressure in the reaction vessel was reduced. Then, tetrafluoroethylene was charged in the reaction vessel in such an amount that the pressure was 6 kg/cm²G in the standard state.

The reaction vessel was placed in a drying heater adjusted at 30° C., and the reaction vessel was kept horizontal and connected to a motor. Polymerization was conducted under rotation at about 50 rpm. When the polymerization was continued at 30° C. for about 3 hours, the pressure of tetrafluoroethylene had been reduced to 2.0 kg/cm²G. At this point, the reaction vessel was taken out, tetrafluoroethylene was released and the reaction vessel was opened. When the glass cylinder was taken out from the reaction vessel, it was found that a semi-transparent, fluorine-containing polymer film was formed on the inner wall of the cylinder.

When the cylindrical film was taken out and cut-opened and the thickness was measured, it was found that the thickness was 120 to 130μ. The film was tough and flexible.

In order to convert the sulfonyl fluoride group of the obtained fluorine-containing polymer film to a sulfonic acid group by hydrolysis, the film was immersed in a mixed solution of sodium hydroxide, dimethyl sulfoxide and water (3/7/11 weight ratio) at 90° C. for 15 hours. When the ion-exchange capacity of the obtained film was measured by the titration method, it was found that the ion-exchange capacity was 0.75 meq/g of the dry resin. When both the surfaces of the film were observed by a scanning electron microscope, the surface which had been kept in contact with the inner wall of the cylinder was flat even at 500 magnifications, but the other surface had many convexities and concavities having a size of 2 to 15μ and was porous.

EXAMPLE 2

A film was prepared according to the same procedures as described in Example 1 except that a mixture comprising 0.3 g of a compound of the following formula:

$$CF_2=CFOCF_2CF_2OCF=CF_2$$

and 0.9 g of a compound of the following formula:

$$CF_2=CFOCF_2\overset{CF_3}{\underset{|}{C}}FOCF_2CF_2SO_2F$$

was used instead of $$CF_2=CFOCF_2\overset{CF_3}{\underset{|}{C}}FOCF_2CF_2SO_2F$$

used in Example 1. When polymerization was conducted at 35° C. for 2.5 hours, the pressure of tetrafluoroethylene had been reduced to 2.5 kg/cm² from 6 kg/cm².

At this point, tetrafluoroethylene was expelled from the reaction vessel and the formed film was taken out. The film was a semi-transparent and flexible as the film obtained in Example 1. The thickness was about 140 to about 150μ. In order to effect hydrolysis, the film was immersed in the same mixed solution as used in Example 1 at 90° C. for 10 hours. It was found that the ion-exchange capacity was 0.86 meq/g of the dry resin.

When the film was observed by a scanning electron microscope in the same manner as described in Example 1, it was found that the surface contacted with the inner wall of the reaction vessel was flat even at 1000 magnifications but the other surface was porous and had convexities and concavities having a size of 5 to 10μ.

In order to examine the effect of CF₂=CFOCF₂CF₂OCF=CF₂, the film before the hydrolysis was subjected to the fusion test, as well as the film obtained in Example 1. It was found that the film of Example 1 could be fusion-bonded by pressing at 250° C. but the film of this Example could not be fusion-bonded even at 300° C. Therefore, it was confirmed that a substantially crosslinked, fluorine-containing polymer film was obtained in this Example.

EXAMPLE 3

In the same manner as described in Example 1, 5 mole% of a radical initiator of the formula:

$$CF_3CF_2CF_2CF_2\overset{O}{\underset{\|}{C}}OO\overset{O}{\underset{\|}{C}}CF_2CF_2CF_2CF_3$$

was dissolved in a compound of the following formula:

$$CF_2=CFOCF_2\overset{CF_3}{\underset{|}{C}}FOCF_2CF_2CF_3$$

The solution was cast on a stainless steel plate (10 cm×15 cm) having an end ridge for preventing the cast liquid from flowing out. The amount of the solution corresponded to a thickness of about 80μ, as calculated from the specific gravity of the monomer. The plate was horizontally placed in a reaction vessel having a length of 20 cm and including an opening of 12 cm×5 cm, and the inside atmosphere of the reaction vessel was replaced by tetrafluoroethylene and the tetrafluoroethylene pressure was elevated to 15 kg/cm². Polymerization was conducted at 25° C. for 8 hours.

When the pressure had been reduced to 5 kg/cm², the reaction vessel was opened and the plate was taken out. A substantially transparent film was formed on the surface of the plate. The thickness was 110μ and the film was flexible.

By the scanning electron microscope observation, it was found that convexities and concavities having a size of about 5 to about 20μ were present on the surface contacted with tetrafluoroethylene, but the other surface was flat.

EXAMPLE 4

In a ¼ molar ratio mixture of CF₂=CFOCF₂CF₂COOCH₃/CF₂=CFOCF₂CF₂OCF=CF₂, 5 mole% of $$ClCF_2CF_2CF_2\overset{O}{\underset{\|}{C}}-OO-\overset{O}{\underset{\|}{C}}CF_2CF_2CF_2Cl$$

was dissolved, and the solution was flow-cast on the surface of mercury placed in a Petri dish. The Petri dish was placed in a reaction vessel and polymerization was carried out at 30° C. under a nitrogen pressure of 1 kg/cm² for 15 hours. A transparent film having a thickness of about 0.2 mm was obtained. By the scanning electron microscope observation, it was confirmed that both the surfaces of the film were smooth.

EXAMPLE 5

The peroxide solution used in Example 1 was concentrated to 70%, and the concentrate was added in an amount corresponding to 10 mole% to a ¼ molar ratio liquid mixtrure of $$CF_2=CFOCF_2CF_2CF_2SO_2F/$$

A film was prepared in the same manner as described in Example 1. Namely, the solution was charged in the glass cylinder so that the thickness was about 0.5 mm. Polymerization was carried out at 50° C. and 30 rpm under a tetrafluoroethylene pressure of 8 kg/cm² for 2 hours.

The thickness of the obtained film was about 0.6 mm. By the scanning electron microscope observation, the presence of convexities and concavities of a size 5 to 20μ was confirmed.

In order to hydrolyze the sulfonyl fluoride and carboxylic acid ester groups present in the film, the film was immersed in a methanol/water mixed solvent (1/1 volume ratio) containing 10% of NaOH at 80° C. for 10 hours.

When the exchange capacity was determined according to the pH titration method, it was found that the total exchange capacity was 1.1 meq/g of the dry resin. The sulfonic acid group/carboxylic acid group ratio was substantially the same as that in the starting mixture.

EXAMPLE 6

In the same manner as described in Example 1, 1 mole% of was added to

The solution was charged in the same reaction vessel as used in Example 1 so that the thickness of the liquid film was about 160μ. The reaction vessel was cooled by liquefied air and was then degasified. The temperature was elevated to 0° C., and 0.6 g of $CF_2=CFCF=CF_2$ and 10 kg/cm² of tetrafluoroethylene were charged into the reaction vessel. In the same manner as described in Example 1, polymerization was carried out at 25° C. and 200 rpm for 5 hours, whereby the pressure had been reduced to 5 kg/cm².

The reaction vessel was opened and the filmy polymer was withdrawn. A semi-transparent film having a thickness of 180μ was obtained.

When the infrared absorption spectrum was determined according to the ATR method, it was found that a strong absorption band attributed to the sulfonyl fluoride group was present at 1470 cm⁻¹. When the film before the hydrolysis was pressed at 300° C., fusion bonding was not caused.

When the film was hydrolyzed in the same manner as described in Example 1 and the ion-exchange capacity was measured, it was found that the ion-exchange capacity was 0.6 meq/g of the dry resin. The presence of convexities and concavities having a size of 10 to 30μ on the surface of the film was confirmed by the scanning electron microscope observation.

EXAMPLE 7

To a liquid mixture of 1.6 g of $CF_2=CFOCF_2CF_2CF_2SO_2F$ and 0.3 g of $CF_2=CFOCF_2CF_2OCF=CF_2$ was added 5 mole% of the radical initiator used in Example 3, and a film was prepared in the same manner as described in Example 1. Namely, polymerization was carried out at 30° C. and 100 rpm under a tetrafluoroethylene pressure of 15 kg/cm² for 8 hours, whereby the pressure had been reduced to 1.3 kg/cm².

The reaction vessel was opened and the filmy product was withdrawn. A flexible, semi-transparent film having a thickness of about 210μ was obtained. When the exchange capacity was measured after immersing the film in the hydrolyzing liquid used in Example 1 at 90° C. for 15 hours, it was found that the exchange capacity was 0.4 meq/g of the dry resin. When the surface contacted with tetrafluoroethylene was observed by a scanning electron microscope, it was found that the surface was porous and had convexities and concavities having a size of about 2 to about 30μ.

APPLICATION EXAMPLE 1

The hydrolyzed film obtained in Example 2 was immersed in 1N-HCl at room temperature for 10 hours. Then, the film was washed with water to form a film of the H⁺ type.

The following treatment was carried out so as to convert sulfonic acid groups in the surface portion to carboxylic acid groups.

The film of the H⁺ type was attached to the inner circumference of a reaction vessel comprising a stainless steel cylinder having an inner diameter of 8 cm and including upper and lower nozzles and a mercury lamp (Model GL-15 supplied by Toshiba) mounted at the center of the stainless steel cylinder, while directing the surface having the convexities and convavities to the center of the reaction vessel so that the surface was uniformly irradiated with ultraviolet rays from the lamp. The reaction vessel was immersed in an oil bath, nitrogen was introduced at a flow rate of 50 cc/mm from the lower nozzle, and the temperature was elevated to 160° C. while discharging nitrogen from the upper nozzle. Then, introduction of nitrogen was stopped, and the nozzle was connected to a vacuum pump and drying was effected for 1 hour under reduced pressure. Then, the pressure in the reaction vessel was reduced to −76 mmHg. Then, 5 cmHg each of nitrogen monoxide (NO) and nitrogen dioxide (NO₂) were introduced, and nitrogen was further introduced so that the total pressure became atmospheric.

The mercury lamp was lighted to start irradiation. After 30 minutes' irradiation, the lamp was put off, and nitrogen was introduced into the reaction vessel to purge the nitrogen oxides.

The film was taken out from the reaction vessel, and a part of the film was subjected to the infrared absorption spectrum measurement (ATR method). The remaining part of the film was heated in a mixed solvent of methanol/water (1/1 volume ratio) containing 20% of NaOH for 30 minutes to convert the ion-exchange group to the Na+ type, and the film was subjected to the dyeing and electrolysis tests. An absorption band having a medium intensity, which was attributed to the carboxyl group, was observed at 1780 cm$^{-1}$ in the infrared spectrum of the ultraviolet ray-irradiated surface. It was confirmed that by conversion to the Na+ type, this absorption band was shifted to 1680 cm$^{-1}$. On the other hand, an absorption band of the sulfonic acid group was hardly observed. In the infrared absorption spectrum of the surface not irradiated with ultraviolet rays, an absorption band of the sulfonic acid group was observed at 1064 cm$^{-1}$ but an absorption band of the carboxyl group at 1780 cm$^{-1}$ was hardly observed. A part (about 5 mm × about 10 mm) of the film converted to the Na+ type was immersed at room temperature for 15 hours in a dyeing solution formed by dissolving 100 mg of Crystal Violet in 100 cc of a mixed solvent of 0.5NHCl and methanol (3/7 volume ratio). The dyed film was washed with water, then sliced by a microtome and the section was observed by a microscope. A portion having a thickness of 15μ from one surface was not dyed at all, but the remaining portion was dyed in a dense green color. Accordingly, it was confirmed that carboxyl groups were present in the portion having a thickness of 15μ from the surface.

The results of the electrolysis test made on the film converted to the Na+ type after the ultraviolet ray treatment and the film not subjected to the ultraviolet ray treatment are shown in Table 1. The electrolysis test was carried out in the following manner.

A two-chamber type cell comprising an anode chamber of titanium and a cathode chamber of nickel and having an effective area of 0.1 dm$^2$ was used. An anode comprising a titanium lath covered with titanium oxide and ruthenium oxide and a cathode of a soft steel lath were used. The film was inserted between the anode chamber and the cathode chamber so that the film contacted closely to the anode and a distance of 2 mm was formed between the film and cathode (in the case of the film irradiated with ultraviolet rays, the irradiated surface was directed to the cathode), and a saturated aqueous solution of sodium chloride having a Ca concentration lower than 0.5 ppm was supplied to the anode chamber and while the sodium chloride concentration of the anode chamber was kept at 3.5N. Pure water was supplied to the cathode chamber so that the NaOH concentration was kept at 11N. The current density was adjusted to 30 A/dm$^2$ and the electrode temperature was controlled to 90° C.

TABLE 1

|  | Cell Voltage (V) | Current Efficiency (NaOH) (%) | NaCl Concentration in 50% NaOH (ppm) |
| --- | --- | --- | --- |
| After Ultraviolet Ray Treatment | 3.15 (initial stage) | 96 | 25 |
|  | 3.15 (after 6 months) | 96 | 25 |
| Untreated | 3.10 | 51 | 250 |

From the foregoing results, it is seen that if carboxylic acid groups are introduced into the surface portion of the film of the present invention having cation-exchange groups, there can be obtained a membrane retaining good electrolytic characteristics for a long time. It also is seen that even if the distance between the cathode and the membrane is narrowed until the membrane contacts the cathode, the cell voltage is reduced only by a quantity corresponding to the solution electric resistance and increase of the cell voltage by adhesion of hydrogen bubbles to the membrane is not caused.

EXAMPLE 8

A cylindrical stainless steel reaction vessel having an inner diameter of 10 cm and a length of 5 cm, the inner surface of which was mirror-polished, was cooled to −10° C., and a 3% solution of a compound of the following formula:

in perfluoro-n-hexane was charged in an amount corresponding to 2 mole% based on the fluorine-containing vinyl monomer. In the same manner as described in Example 1, the pressure within the reaction vessel was reduced to evaporate perfluoro-n-hexane, and the reaction vessel was immersed in liquefied air and evacuated to substantially −76 mmHg by a vacuum pump. The reaction vessel was filled with nitrogen and the temperature was elevated to −10° C. Then, 4 g of $CF_2=CFOCF_2CF_2CF_2CF_2COOCH_3$ and 0.6 g of $CF_2=CFOCF_2CF_2OCF=CF_2$ were added as the fluorine-containing vinyl monomer together with 10 kg/cm$^2$ of tetrafluoroethylene to the reaction vessel. The reaction vessel was arranged so that the central line of the cylinder of the reaction vessel acted as the vertical rotation axis, and a motor and a bearing were precisely attached to the upper and lower portions of the reaction vessel, respectively, so that high speed rotation could be performed.

The temperature around the reaction vessel was adjusted to 40° C., and the reaction vessel was rotated at 4000 rpm. After 5 hours' passage, the rotation was stopped and the reaction vessel was disconnected from the motor. It was found that the pressure of tetrafluoroethylene had been reduced to 6 kg/cm$^2$. The inner pressure was released and a lid was removed from the reaction vessel. A white, semi-transparent, soft and flexible film having a thickness of about 100μ was obtained on the inner wall. When the infrared absorption spectrum of the obtained film was measured, it was found that there were present a peak attributed to the methyl group at about 2900 cm$^{-1}$, a peak attributed to the carboxylic group at 1780 cm$^1$ and a peak attributed to the CF bond at 1300 to 1100 cm$^{-1}$.

The film was hydrolyzed to form a cation-exchange membrane, and the capacity of exchange of carboxyl groups was measured. It was found that the exchange capacity was 1.1 meq/g of the dry resin. When the surfaces of the membrane were observed by a scanning electron microscope, it was found that the surface which had been contacted with tetrafluoroethylene was porous and had convexities and concavities having a size of 3 to 15μ but the other surface was flat.

By using the same apparatus and electrolysis conditions as those described in Application Example 1, the electrolysis test was carried out so that the distance between the cathode and membrane was adjusted to 2 mm or the membrane contacted closely to the cathode, with respect to both the case where the surface having convexities and concavities was directed to the cathode and the case where the flat surface was directed to the cathode. When the surface having convexities and concavities was directed to the cathode and the distance between the cathode and membrane was adjusted to 2 mm or the membrane contacted closely to the cathode, the cell voltage was reduced by a value corresponding substantially to the electric resistance of the solution, but in the case where the surface having convexities and concavities was directed to the anode, when the membrane contacted closely to the cathode, the cell voltage was larger by about 0.3 V than the cell voltage obtained when the distance between the cathode and membrane was adjusted to 2 mm. In each case, the current efficiency and the sodium chloride concentration in the caustic soda solution were 95 to 96% and 20 to 30 ppm, respectively.

EXAMPLE 9

The same reaction vesssel as used in Example 1 was charged with a liquid mixture comprising $CF_2=CFOCF_2CF_2CF_2-SO_2F$ and $CF_2=CFOCF_2CF_2OCF_2CF_2OCF=CF_2$ at a weight ratio of 5/1, which contained, dissolved therein, $CF_3C(NF_2)=C(NF_2)CF_3$ as the polymerization initiator in an amount corresponding to 0.1 mole% based on the monomer, and polymerization was carried out at 80° C. and 100 rpm for 15 hours while filling nitrogen under 20 kg/cm² in the reaction vessel so as to prevent dissipation of the fluorine-containing vinyl monomers.

The obtained film had a thickness of 150μ and was transparent and tough. By the scanning electron microscope observation, it was confirmed that the surface was smooth. When the film was hydrolyzed, it was found that the ion-exchange capacity was 1.1 meq/g of the dry film.

EXAMPLE 10

The same 5% soluton of in Freon 113 as used in Example 1 was added to 1.2 g of as the fluorine-containing vinyl monomer. The amount of the above compound corresponded to 1 mole% based on the fluorine-containing vinyl monomer. In the same reaction vessel as used in Example 1, Freon 113 as the solvent was removed by evaporation and keeping the reaction vessel to −5° C. and reducing the pressure. Under cooling, the pressure was restored to the atmospheric pressure and about 1.4 g of was added. The glass cylinder was inserted into a cylindrical stainless steel reaction vessel having a pressure gauge so that the rotation axis was in agreement with that of the rotation axis of the reaction vessel. The reaction vessel was cooled by liquefied air and the pressure within the reaction vessel was reduced, and tetrafluoroethylene was charged into the reaction vessel so that the pressure was 6 kg/cm².

The reaction vessel was placed into a heater maintained at 30° C., and the reaction vessel was connected in the horizontal state to a motor, and polymerization was continued at about 50 rpm. When about 3 hours had passed at 30° C., it was found that the pressure of tetrafluoroethylene had been reduced to 2.0 kg/cm². At this point, the reaction vessel was taken out and the pressure of tetrafluoroethylene was released in a glove box filled with argon, and the reaction vessel was opened. The glass cylinder was taken out. It was found that a semitransparent film was formed on the inner wall of the cylinder.

Then, in order to effect polymerization of the second stage, the glass cylinder was cooled to 0° C. and a liquid mixture containing 0.5 g of $CF_2=CFOCF_2CF_2CF_2-COOCH_3$, 0.1 g of $CF_2=CFOCF_2CF_2OCF=CF_2$ and 2 mole% of the above-mentioned diacyl peroxide was charged into the glass cylinder. The glass cylinder was inserted into a reaction vessel to construct a reactor. The reaction vessel was cooled by liquefied air and the pressure in the reaction vessel was reduced, and tetrafluoroethylene was charged into the reaction vessel so that the pressure was 10 kg/cm². The reaction vessel was placed in a heater maintained at 35° C. and polymerization was conducted at 80 rpm in the same manner as described above. It was found that the pressure of tetrafluoroethylene had been reduced to 4 kg/cm² over a period of 2 hours. The rotation was stopped and the pressure of remaining tetrafluoroethylene was reduced. When the reaction vessel was opened, it was found that a semitransparent film was formed on the inner wall of the glass cylinder. When the cylindrical film was cut-opened and the thickness was measured, it was found that the thickness was about 180μ. In order to hydrolyze the sulfonyl fluoride and carboxylic acid ester groups, the film was immersed in a sodium hydroxide/dimethyl sulfoxide/water mixture (3/7/11 weight ratio) at 90° C. for 15 hours. The film was washed with water, and a part of the film was cut out and was immersed in a dyeing solution of 5N HCl and methanol (3/7 volume ratio) containing 100 mg of Crystal Violet at room temperature for 15 hours. After water washing, a slice of the section was observed by an optical microscope. It was found that the first layer (the layer in which the sulfonic acid groups were present) was dyed in a dense green color in a thickness of about 120μ but the second layer (the layer in which the carboxylic acid groups were present) having a thickness of about 60μ was not dyed at all. The surface contacted with the inner wall of the reaction vessel (the surface of the layer where sulfonic acid groups were present) was smooth, but convexities and concavities having a size of about 2 to about 18μ were observed in the boundary between the two layers and the surface of the layer where the carboxylic acid groups were present. The boundary intruded into the layer where the carboxylic acid groups were present and convexities and concavities having a size of about 5 to 20μ were formed. When another part of the film was subjected to the determination of the infrared absorptrion spectrum according to the ATR method, an absorption band was observed at 1064 cm⁻¹ on the surface where the sulfonic acid groups were present and an absorption band attributed to the Na+ salt of the perfluorocarboxylic acid was observed at 1680 cm$^{-1}$ on the other surface. Thus, it was confirmed that the film had a two-layer structure. When the ion-exchange capacity of the film was determined from the infrared absorption spectrum, it was found that the exchange capacity of sulfonic acid groups was 0.83 meq/g of the dry resin and the exchange capacity of carboxylic acid groups was 0.92 meq/g of the dry resin.

In order to examine the properties of the film as ion-exchange membrane for electrolysis, the electrolysis test was carried out under the same conditions by using the same apparatus as described in Application Example 1. The cell voltge was 3.30 V, the current efficiency of caustic soda was 96%, and the sodium chloride concentration in caustic soda was 30 ppm (calculated based on 50% caustic soda). The electrolysis was conducted under the same conditions except that the membrane contacted closely to the cathode without providing a space of 2 mm between the cathode and membrane. The cell voltage was reduced by 50 mV corresponding to the resistance of the catholyte solution, but the current efficiency and the sodium chloride concentration in caustic soda were not changed at all.

COMPARATIVE EXAMPLE 1

The following experiment was carried out in order to examine the interlaminar peel strength of a multi-layer film.

It was checked whether a two-layer film having the same composition and structure as those of the membrane obtained in Example 10 and having sulfonyl fluoride and carboxylic acid ester groups could be obtained by heat fusion bonding.

The same method, apparatus and conditions as described in Example 10 were adopted for obtaining films containing sulfonyl fluoride and carboxylic acid ester groups, respecitvely. At first, and tetrafluoroethylene in the same charge amounts as described in Example 10 were polymerized at 30° C. for about 3 hours to obtain a film containing sulfonyl fluoride groups and having a thickness of about 120μ. Separately, $CF_2=CFOCF_2CF_2CF_2CF_2COOCH_3$, $CF_2=CFOCF_2CF_2-OCF=CF_2$ and tetrafluoroethylene in the same charge amounts as described in Example 10 were polymerized to obtain a film containing carboxylic acid ester groups. Even when both the films were piled together and pressed under 150 kg/cm$^2$ at a temperature of 200° C., fusion bonding could not be effected.

In order to examine influences of $CF_2=CFOCF_2CF_2-OCF=CF_2$, a film composed of $CF_2=CFOCF_2CF_2CF_2CF_2COOCH_3$ and tetrafluoroethylene was prepared under the same polymerization conditions, and when this film was piled on a film containing sulfonyl fluoride groups and pressed at 200° C. under a pressure of 150 kg/cm$^2$, one film was obtained by heat fusion bonding. When this film and the film of Example 10 after conversion to the Na+ type were immersed in boiling water for 1 hour, many blisters were present in the lamination interface of the film obtained by fusion bonding but the film of Example 10 was not substantially changed though the film was somewhat swollen.

EXAMPLE 11

A two-layer film having sulfonyl fluoride groups was prepared by adopting the same reaction vessel and procedures as described in Exmaple 10. Namely, $CF_2=CFOCF_2CF_2CF_2SO_2F$ in an amount corresponding to the film thickness of about 100μ and 5 mole% of the same radical initiator as used in Example 10 were charged in the glass cylinder and first-stage polymerization was carried out at 40° C. and 100 rpm under a tetrafluoroethylene pressure of 10 kg/cm$^2$. The polymerization was conducted for 5 hours, by which time the tetrafluoroethylene pressure had been reduced to 4 kg/cm$^2$. The tetrafluoroethylene pressure was released, and the reaction vessel was cooled by dry ice and opened in the same glove box as used in Example 10. The, a mixture comprising and $CF_2=CFOCF_2CF_2OCF=CF_2$ at a weight ratio of 10/1 was added in an amount corresponding to the film thickness of about 50μ, and tetrafluoroethylene was supplied under a pressure of 8 kg/cm$^2$ and second-stage polymerization was carried out at 35° C. and 50 rpm for 6 hours, by which time the tetrafluoroethylene pressure was reduced to 3 kg/cm$^2$. The tetrafluoroethylene pressure was released, the reaction vessel was opened and the formed film was taken out. The sulfonyl fluoride groups were hydrolyzed by using the same hydrolyzing solution as used in Example 10.

When the film was washed with water and both the surfaces of the film were subjected to the infrared absorption analysis according to the ATR method, it was found that an absorption band attributed to the sulfonic acid groups was present at 1064 cm$^{-1}$ on the side where was polymerized and an absorption band attributed to the sulfonic acid groups was present at 1045 cm$^{-1}$ on the other side. Even when both the surface portions were shaven out along a thickness of 30μ, the same spectrum was observed. Accordingly, it was confirmed that the film had a two-layer strucutre. When the ion-exchange capacity was determined from the absorption intensity, it was found that the ion-exchange capacity was 0.87 meq/g of the dry resin on the side where was polymerized and the ion-exchange capacity was 0.90 meq/g of the dry resin on the other side. When the film was examined by a scanning electron microscope, it was found that convexities and concavities having a size of 2 to 20μ were present on the surfaces and in the interface between the two layers.

APPLICATION EXAMPLE 2

The sulfonic acid groups of the film obtained in Example 11 were converted to carboxylic acid groups by adopting the same apparatus and procedures as described in Application Example 1. More specifically, the film was attached to a reaction vessel along the inner wall thereof. This reaction vessel comprised a stainless steel cylinder having an inner diameter of 8 cm and having nozzles arranged in the upper and lower portions thereof and a mercury lamp (Model GL-15 supplied by Toshiba) arranged at the center of the cylinder. The film was attached to the inner circumferential surface of the reaction vessel so that the surface of the film of the H+ type where was polymerized was directed to the center and uniformly irradiated with ultraviolet rays from the lamp. The reaction vessel was immersed in an oil bath and nitrogen was introduced at a flow rate of 50 cc/min from the lower nozzle and discharged from the upper nozzle, and the temperature was elevated to 160° C. in this state. Then, introduction of nitrogen was stopped and a vacuum pump was connected to the nozzle, and drying under reduced pressure was conducted for 1 hour. Then, the pressure was reduced to −76 mmHg in the reaction vessel, and nitrogen monoxide (NO) and nitrogen dioxide ($NO_2$) were introduced in amounts corresponding to 5 cmHg from the nozzle and nitrogen was further introduced so that the atmospheric pressure was maintained in the reaction vessel.

The mercury lamp was lighted to start irradiation. After 1 hour's irradiation, the lamp was put off and nitrogen was introduced into the reaction vessel to purge the nitrogen oxides.

The film was taken out, and a part of the film was cut out and subjected to the infrared absorption spectrum analysis (ATR method). The remaining part of the film was heated for 30 minutes in methanol-water (volume ratio of 1/1) containing 20% of NaOH to convert the ion-exchange groups to the Na+ type and was then subjected to the dyeing test and the electrolysis test. In the infrared absorption spectrum of the irradiated surface, an absorption band of a medium intensity attributed to the carboxylic acid group was observed at 1780 $cm^{-1}$. It was found that this absorption band was shifted to 1680 $cm^{-1}$ by conversion to the Na+ type. When the exchange capacity was determined from this intensity, it was found that the exchange capacity was 0.85 meq/g of the dry resin.

A part of the film converted to the Na+ type was immersed for 15 hours in the dyeing solution used in Example 10. After water washing, the section was sliced by a microtome and observed by an optical microscope. A layer having a thickness of 15μ from one surface was not dyed at all while the other layer was dyed in a dense green color. Accordingly, it was confirmed that carboxylic acid groups were present in a thickness of 15μ from the surface.

From the foregoing results, it was confirmed that the film had a three-layer structure having an uncrosslinked, sulfonic acid group-containing layer on one surface, a crosslinked, sulfonic acid group-containing layer and a crosslinked, carboxylic acid group-containing layer.

The carboxylic acid group-present surface of the film was directed to the cathode and the electrolysis test was carried out by adopting the same apparatus and electrolysis conditions as described in Application Example 1 while adjusting the space between the film and the cathode to 2 mm. The cell voltage was 3.39 V, the current efficiency of caustic soda was 95%, and the sodium chloride concentration in caustic soda was 40 ppm.

For comparison, the film in which carboxylic acid groups had not been introduced was subjected to the electrolysis test. The cell voltage was 3.29 V, the current efficiency of caustic soda was 54%, and the sodium chloride concentration in caustic soda was 200 ppm.

EXAMPLE 12 containing 5 mole% of was flow-cast on a stainless steel plate having a ridge formed around the periphery to prevent the cast liquid from flowing out. The amount of the liquid calculated from the specific gravity of the monomer corresponded to a thickness of about 150μ. The plate was horizontally placed in a reaction vessel, and tetrafluoroethylene was added under a pressure of 6 kg/$cm^2$ to the reaction vessel. Polymerization was carried out at 25° C. for 8 hours. When the tetrafluoroethylene pressure was reduced to 2 kg/$cm^2$, the tetrafluoroethylene pressure was released and the temperature in the reaction vessel was lowered to 0° C., and the reaction vessel was opened. It was found that a semi-transparent film was formed on the stainless steel plate.

Then, a mixture comprising $CF_2$=$CFOCF_2CF_2CF_2COOCH_3$, and $CF_2$=$CFOCF_2CF_2OCF$=$CF_2$ at a weight ratio of 5/1/1 and containing 1 mole% of the above-mentioned radical initiator was rapidly flow-cast on the above film in an amount corresponding to a thickness of 50μ calculated from the flow-cast area, and the reaction vessel was closed and tetrafluoroethylene was added under a pressure of 10 kg/$cm^2$. When polymerization was carried out at 50° C. for 5 hours and the pressure was reduced to 6 kg/$cm^2$, the tetrafluoroethylene pressure was released. Furthermore, a solution formed by dissolving 3 mole% of in a liquid mixture comprising and CF₂CFOCF₂CF₂OCF=CF₂ at a weight ratio of 10/1 was flow-cast as a third layer on the stainless steel plate in an amount corresponding to a thickness of 50μ. Tetrafluoroethylene was introduced under a pressure of 8 kg/cm² and polymerization was carried out at 40° C. for 5 hours. At this point, the tetrafluoroethylene pressure was 4 kg/cm². Then, the tetrafluoroethylene pressure was released, the reaction vessel was opened and the stainless steel plate was taken out. A semi-transparent film was obtained. The film was immersed in the hydrolyzing solution used in Example 10 to effect the hydrolysis and then, the dyeing test was carried out. When the section was observed by an optical microscope, it was found that portions of about 150μ and about 50μ from both the surfaces were dyed in a green color and the intermediate portion of about 50μ was not dyed at all.

In the boundary between the first polymerized sulfonyl fluoride layer and the carboxyic acid layer, convexities and concavities having a size of 5 to 15μ and being dyed in a green color intruded into the carboxylic acid layer from the sulfonyl fluoride layer. In the boundary between the carboxylic acid layer and the sulfonyl fluoride layer as the third layer, undyed convexities and concavities having a size of 5 to 20μ intruded into the green sulfonyl fluoride layer. Green convexities and concavities having a size of 5 to 20μ were present on the surface of the third layer.

Parts of the respective layers were taken out and the exchange capacities were determined from the infrared absorption spectra. It was found that the exchange capacities of the first sulfonic acid layer, the carboxylic acid layer and the third sulfonic acid layer were 0.85, 0.96 and 0.80 meq/g of the dry resin, respectively.

EXAMPLE 13

A mixture comprising C₃F₇OCF=CF₂ and CF₂=CFOCF₂CF₂OCF₂CF₂OCF=CF₂ at a molar ratio of 20/1 and containing 2 mole% of as the polymerization initiator was flow-cast on the stainless steel plate used in Example 12. The plate was placed in a reaction vessel and tetrafluoroethylene was introduced under a pressure of 6 kg/cm², and polymerization was conducted at 15° C. for 6 hours, by which time the pressure was reduced to 3 kg/cm². The temperature in the reaction vessel was lowered to −5° C., and the stainless steel plate was taken out in the glove box used in Example 10.

Then, containing 1 mole% of was flow-cast on the stainless steel plate. The stainless steel plate was placed in the reaction vessel again and tetrafluoroethylene was supplied under a pressure of 8 kg/cm². Then, polymerization was conducted at 20° C. for 5 hours, whereby the tetrafluoroethylene pressure was reduced to 5 kg/cm². At this point, the tetrafluoroethylene pressure was released, and the reaction vessel was opened and the stainless steel plate was taken out. A semi-transparent film was formed. A part of the film was cut out and subjected to hydrolysis and dyeing. It was found that the film comprised an undyed layer having a thickness of about 100μ and a layer dyed in a dense green color and having a thickness of about 10μ on the side of one surface. When the exchange capacity of the sulfonic acid layer was determined according to the titration method, it was found that the exchange capacity was 0.87 meq/g of the dry resin.

When specimens of the film before the hydrolysis were pressed at 250° C. under a pressure of 50 kg/cm², fusion bonding was possible when the sulfonyl fluoride group-containing surfaces were made to confront each other, but in other cases, fusion bonding could not be accomplished.

EXAMPLE 14

Figure 1:
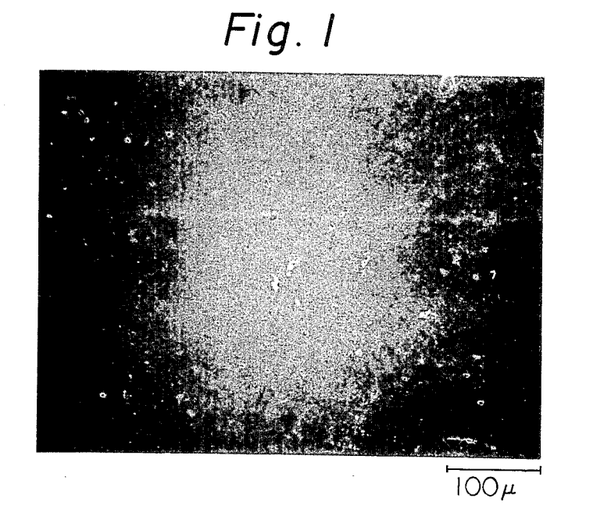
FIG. 1 is a scanning electron photograph of the texture of the smooth surface of a crosslinked, fluorine-containing copolymer film obtained in Example 14 given hereinafter according to the present invention.

The inner bottom surface of a cylindrical reaction vessel of stainless steel having an inner diameter of 20 cm and a depth of 4 cm was horizontally set so that when a liquid was charged into the reaction vessel, the liquid could be flow-cast in a uniform thickness. Then, 6 g of a mixture comprising CF₂=CFOCF₂CF₂CF₂COOCH₃ and CF₂=CFOCF₂CF₂CF₂OCF=CF₂ at a weight ratio of 3/7 and containing 1 mole% of the radical initiator used in Example 1 was charged into the reaction vessel. The bottom of the reaction vessel was cooled from the outside by liquefied air, and the pressure in the reaction vessel was reduced to almost 0 mmHg by a vacuum pump. Nitrogen was introduced into the reaction vessel so that when the temperature was restored to room temperature, the pressure would be 3 kg/cm². Then, the reaction vessel was heated to 25° C. and polymerization was conducted for 20 hours. Nitrogen was purged and the reaction vessel was opened. A substantially transparent film having a thickness of about 120μ was formed in the bottom portion of the reaction vessel. When the exchange capacity was determined after hydrolysis, it was found that the exchange capacity was 1.0 meq/g of the dry resin. When both the surfaces were examined by a scanning electron microscope, it was found that both the surfaces were substantially smooth. A scanning electron microscope photograph of the surface of the obtained film is shown in FIG. 1.

EXMAPLE 15

A fabric composed of yarns, each being formed by twisting 15 polytetrafluoroethylene filaments having a size of 15 to 20μ, which had a weft density of 20 yarns/inch and a warp density of 20 yarns/inch, was attached to an annular frame having an outer diameter of 19 cm and an inner diameter of 18 cm while smoothing out wrinkles from the fabric. The annular frame was attached to the inner bottom surface of the reaction vessel used in Example 14 so that one surface of the fabric contacted to the inner bottom surface of the reaction vessel. A lid was attached to the reaction vessel, and the bottom portion of the reaction vessel was immersed in a cooling medium maintained at $-10°$ C. Then, a mixture of 6 g of $CF_2=CFOCF_2CF_2CF_2COOCH_3$ and 1 g of $CF_2=CFOCF_2CF_2OCF=CF_2$ containing 2 mole% of the radical initiator used in Example 8 was charged into the reaction vessel from a nozzle attached to a flange. After about 1 hour's standing, the cooling medium was removed but the bottom portion of the reaction vessel was cooled by liquefied air instead. The reaction vessel was substantially deaerated by a vacuum pump, and tetrafluoroethylene was introduced into the reaction vessel so that when the temperature was restored to room temperature, the pressure would be 4.0 kg/cm$^2$. A Dewar flask charged with liquefied nitrogen was removed from the bottom of the reaction vessel, and the bottom portion of the reaction vessel was heated to 30° C. Polymerization was conducted at this temperature for 2 hours, whereby the tetrafluoroethylene pressure was reduced to 3.6 kg/cm$^2$. Unreacted tetrafluoroethylene was purged and the reaction vessel was opened. It was found that a semi-transparent membrane product was formed. The polytetrafluoroethylene fabric was completely buried in the formed polymer. In the obtained membrane product, the surface contacted with the bottom portion of the reaction vessel was flat and the surface contacted with tetrafluoroethylene had convexities and concavities corresponding to those of the fabric. The thickness was about 250μ in the vicinity of the crossing points of the yarns and about 150μ in the vicinity of mesh points of the fabric. When both the surfaces were examined at elevated magnifications, it was found that the surface contacted with tetrafluoroethylene had fine convexities and concavities having a size of 2 to 20μ. When the exchange capacity was measured after hydrolysis, it was found that the exchange capacity was 1.1 meq/g. By using the same apparatus and conditions as adopted in Application Example 1, the electrolysis test was carried out while the surface having fine convexities and concavities was directed to the cathode. When 13N NaOH was obtained, the cell voltage was 3.28 V, the current efficiency was 96%, and the NaCl concentration in NaOH was 30 ppm (as calculated based on 50% NaOH).

EXAMPLE 16

In the same manner as described in Example 14, the reaction vessel used in Example 14 was charged with 2 g of $CF_2=CFOCF_2CF_2CF_2COOC_2H_5$ containing 1 mole% of the radical initiator used in Example 1 and tetrafluoroethylene under a pressure of 5.0 kg/cm$^2$ and polymerization was carried out at 30° C. for 3 hours, by which time the tetrafluoroethylene pressure was reduced to 4.7 kg/cm$^2$. When tetrafluoroethylene was purged and the reaction vessel was opened, it was found that a semi-transparent thin film was formed on the entire surface of the bottom portion of the reaction vessel. The same polytetrafluoroethylene fabric as used in Example 15 was attached to an annular frame and set on the film so that the fabric was located on the surface of the film. A lid was attached to the reaction vessel, and in the same manner as described above, 7 g of containing 2 mole% of the above-mentioned radical initiator and tetrafluoroethylene under a pressure of 6.0 kg/cm$^2$ were charged into the reaction vessel. Polymerization was conducted at 35° C. for 2.5 hours, by which time the tetrafluoroethylene pressure was reduced to 5.4 kg/cm$^2$. The tetrafluoroethylene pressure was released and the reaction vessel was opened. It was found that a membrane product comprising the polytetrafluoroethylene fabric buried completely in the polymer was formed.

Figure 2:
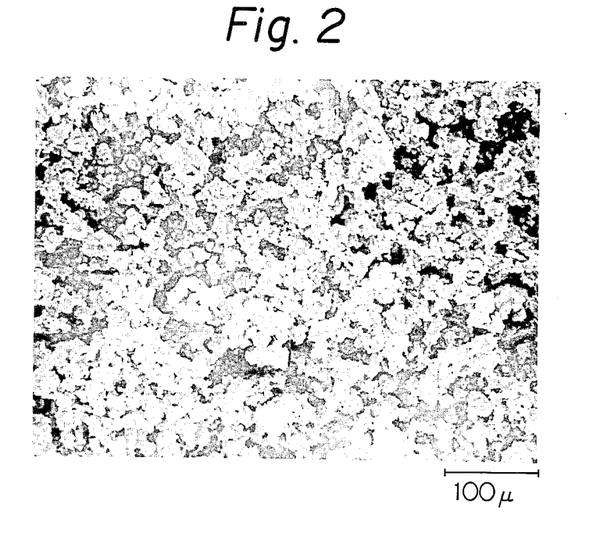
FIG. 2 is a scanning electron photograph showing the surface structure of a film, obtained in Example 16 given hereinafter according to the present invention, on the side contacted with tetrafluoroethylene.

When the exchange capacity was measured by the pH titration method after hydrolysis, it was found that the exchange capacity of carboxylic acid groups was 0.95 meq/g and the exchange capacity of sulfonic acid groups was 0.85 meq/g. The membrane was dyed and the section was observed by an optical microscope. It was found that the undyed layer containing carboxylic acid groups had a thickness of about 50μ and the surface contacted with the reaction vessel was smooth. It was further found that the green-dyed, sulfonic acid group-containing layer had convexities and concavities corresponding to those of the fabric and had a thickness of 280μ in the vicinity of the crossing points of yarns and 150μ in the vicinity of mesh portions of the fabric; also the surface contacted with tetrafluoroethylene had green granular convexities and concavities having a size of 5 to 30μ. The fabric was completely buried in the sulfonic acid group-containing layer. A microscope photograph of the surface having convexities and concavities is shown in FIG. 2. By using the same apparatus and conditions as adopted in Application Example 1, the electrolysis test was carried out in the state where the carboxylic acid group-containing surface was directed to the cathode. When 10N NaOH was obtained, the current efficiency was 96%, the cell voltage was 3.30 V, and the NaCl concentration in NaOH was 40 ppm (as calculated based on 50% NaOH).

COMPARATIVE EXAMPLE 2

In order to examine the influences of the thickness of the thin layer on polymerization, the experiment was carried out in the same manner as described in Example 14 except that the amount of the mixture of the fluorine-containing vinyl monomer was changed to 150 g. The thickness calculated from the amount and specific gravity of the fluorine-containing vinyl monomer mixture and the bottom area of the reaction vessel was about 3 mm. Polymerization was conducted at 25° C. for 20 hours. When the reaction vessel was opened, it was found that a film comprising semi-transparent portions and white portions mingled with one another was obtained and small and large wrinkles were formed on the entire surface of the film. The film could not be put into practical use.

COMPARATIVE EXAMPLE 3

In order to examine the influences of the thickness of the thin layer on polymerization, the experiment was carried out in the same manner as described in Example 12 except that the first polymerization was changed as described below. More specifically, containing 5 mole% of was added in an amount corresponding to a thickness of 2 mm to the fluorine-containing vinyl monomer used in Example 12 and in order to increase the amount of tetrafluoroethylene in proportion to this increase of the fluorine-containing vinyl monomer, a holder was attached through the nozzle of the reaction vessel to increase the volume of the gas phase portion.

Tetrafluoroethylene was introduced under a pressure of 6 kg/cm$^2$, and when polymerization was conducted at 25° C. for about 5 hours, it was found that the tetrafluoroethylene had been reduced to 2 kg/cm$^2$. The tetrafluoroethylene pressure was released and the reaction vessel was opened. It was found that white granular particles having a size of several millimeters were formed on the entire surface of the film. On the other hand, the surface contacted with the stainless steel plate was not sufficiently solidified and a viscous liquid was left.

The reason for this is considered to be that tetrafluoroethylene supplied from the surface was not sufficiently diffused to the bottom portion and the polymerization speed was very low in the bottom portion while the polymerization was promptly advanced in the surface portion and supply of tetrafluoroethylene to the bottom portion was further inhibited, with the result that heterogeneous polymerization was caused.

EXAMPLE 17

A film was prepared by using the same fluorine-containing vinyl monomer in the same apparatus according to the same procedures as described in Example 14. In order to form a second layer film on the obtained film, 6 g of containing 1 mole% of was added and tetrafluoroethylene was supplied under a pressure of 4 kg/cm$^2$. When polymerization was conducted at 30° C. for 6 hours, the tetrafluoroethylene pressure was reduced to 3.3 kg/cm$^2$. At this point, the tetrafluoroethylene pressure was released and the reaction vessel was opened. It was found that a semi-transparent film (hereinafter referred to as "film A") was formed on the entire surface of the bottom portion of the reaction vessel.

A two-layer film was separately prepared by using the same fluorine-containing vinyl monomer in the same apparatus according to the same procedures as described above with respect to the preparation of film A except that tetrafluoroethylene under a pressure of 3.0 kg/cm$^2$ was used instead of nitrogen when a first layer film was formed. More specifically, for the production of the first layer film, polymerization as conducted at 25° C. for 3 hours, whereby the tetrafluoroethylene pressure was reduced to 2.7 kg/cm$^2$. The tetrafluoroethylene pressure was released and the reaction vessel was opened. It was found that a semi-transparent film was formed on the entire surface of the bottom portion of the reaction vessel. The procedures for formation of a second layer film were repeated in the same manner as described above with respect to the production of film A. The obtained two-layer film will be referred to as "film B" hereinafter.

Each of films A and B was immersed in boiling methanol for 50 hours after the hydrolysis. Then, each film was dyed and the section was observed by an optical microscope. In film A, the dyed layer (in which sulfonic acid groups were present) was substantially in parallel to the surface and the boundary between the first layer and the undyed second layer where carboxylic acid groups were present was substantially linear. The surface of the carboxylic acid group-containing layer (the surface contacted with tetrafluoroethylene) had convexities and concavities having a size of 2 to 10μ. In film B, the surface, contacted with the bottom surface of the reaction vessel, of the dyed first layer was smooth, but dyed convexities and concavities having a size of 2 to 15μ were observed in the boundary between this first layer and the second layer where carboxylic acid groups were present. The structure of the surface contacted with tetrafluoroethylene was the same as observed in film A.

The hydrolyzed films A and B were immersed in boiling methanol for 50 hours, and they were dyed and the sections were observed by an optical microscope. In the case of film A, peeling was caused at several points in the boundary between the two layers, but in the case of film B, peeling was hardly observed.

We claim:

1. A process for the preparation of flourine-containing polymer films having a multi-layer structure, which comprises flow-casting a fluorine-containing vinyl monomer, which is liquid under polymerization conditions, in the form of film having a thickness of from 10μ to 1 mm, polymerizing the flow-cast monomer in the presence of a gas phase having a fluorine-containing olefin to form a polymer, flow-casting a fluorine-containing vinyl monomer, which is liquid under polymerization conditions, in the form of a film having a thickness of from 10μ to 1 mm on the so-formed polymer and polymerizing the newly flow-cast monomer in the presence of a gas phase having a fluorine-containing olefin, each so-formed polymer layer containing 5 to 95 mole % of the fluorine-containing olefin units.

2. A process for the preparation of fluorine-containing polymer films according to claim 1, wherein the multi-layer structure is formed by repeating at least two times flow-casting of the fluorine-containing vinyl monomer, which is liquid under polymerization conditions, in the form of a film and polymerization of the flow-cast monomer.

3. A process for the preparation of fluorine-containing polymer films according to claim 1, wherein at least one of the fluorine-containing vinyl monomers, which are liquid under polymerization conditions, contains a group that can be converted to an ion-exchange group.

4. A process for the preparation of fluorine-containing polymer films according to claim 1 or 2, wherein a polyvinyl monomer is contained in at least one of the fluorine-containing vinyl monomers, which are liquid under polymerization conditions, to be supplied for conducting flow-casting and polymerization at least two times repeatedly.

5. A process for the preparation of fluorine-containing polymer film according to claim 4 wherein the fluorine-containing vinyl monomer, which is liquid under polymerization conditions, is flow-cast along the inner wall of a rotary cylinder in the form of a film having a thicness of from $10\mu$ to 1 mm and the flow-cast monomer is then polymerized.

6. A process for the preparation of fluorine-containing polymer films which comprises
   (1) flow-casting at least one fluorine-containing vinyl monomer, which is liquid under polymerization conditions, in the form of a film having a thickness of from $10\mu$ to 1 mm in the absence of a solvent, while one surface of said film is kept in contact with a gas phase,
   (2) providing a fluorine-containing olefin, which is gaseous under polymerization conditions and is co-polymerizable with the fluorine-containing vinyl monomer, in the gas phase contacting the flow-cast monomer,
   (3) polymerizing the flow-cast monomer while dispersing a part of the fluorine-containing olefin present in the gas phase into the flow-cast monomer, and
   (4) obtaining a fluorine-containing polymer film containing 5 to 95 mole % of the fluorine-containing olefin units.

7. A process for the preparation of fluorine-containing polymer films according to claim 6, wherein a mixture of at least two fluorine-containing vinyl monomers which are liquid under polymerization conditions is used as the fluorine-containing vinyl monomer.

8. A process for the preparation of fluorine-containing polymer films according to claim 7, wherein at least one fluorine-containing vinyl monomer of the mixture is a polyvinyl monomer.

9. A process for the preparation of fluorine-containing polymer films according to claim 6, wherein the partial pressure of the fluorine-containing olefin present in the gas phase is changed during the polymerization reaction.

10. A process for the preparation of fluorine-containing polymer films according to claim 6 wherein the fluorine-containing vinyl monomer, which is liquid under polymerization conditions, contains a group that can be converted to an ion-exchange group.

11. A process for the preparation of fluorine-containing polymer films according to claim 10 or 3 wherein the group that can be converted to an ion-exchange group is a sulfonyl halide group or a carboxylic acid ester group.

12. A process for the preparation of fluorine-containing polymer films according to claim 11 wherein the fluorine-containing vinyl monomer, which is liquid under polymerization conditions, is flow-cast in the form of a film having a thickness of from $10\mu$ to 1 mm along the inner wall of a rotary cylinder and the flow-cast monomer is then polymerized.

13. A process for the preparation of fluorine-containing polymer films according to any of claims 7 through 3 or 6, wherein the fluorine-containing vinyl monomer, which is liquid under polymerization conditions, is flow-cast in the form of a film having a thickness of from $10\mu$ to 1 mm along the inner wall of a rotary cylinder and the flow-cast monomer is then polymerized.

14. A process for the preparation of fluorine-containing polymer films according to claim 6 wherein the fluorine-containing vinyl monomer is a compound having at least one polymerizable carbon-to-carbon double bond and at least one hydrogen atom substituted with a fluorine atom in the molecule.

15. A process for the preparation of fluorine-containing polymer films according to claim 6, wherein the fluorine-containing vinyl monomer is a monomer represented by the formula:

wherein
l and p are 0 or 1,
m, n, r and q stand for an integer of from 0 to 4,
X and X' stand for F, H, Cl or $-CF_3$, and
Y stands for $-SO_2-A$, $-COB$, $-CN$, $-CF_3$ or $-CF=CF_2$,
where A stands for OM, F, Cl or Br,
where M stands for H$^+$ or a metal ion, and
B stands for A or OR,
where R is an alkyl group.

16. A process for the preparation of fluorine-containing polymer films according to claim 6, wherein the content of the fluorine-containing olefin is continuously changed through the thickness of the films by changing the partial pressure of the fluorine-containing olefin in the gas phase during polymerization.

17. A process for the preparation of fluorine-containing polymer films according to claim 6, wherein the partial pressure of the fluorine-containing olefin is 0.1 to 200 kg/cm$^2$ (absolute).

18. A process for the preparation of fluorine-containing polymer films according to claim 17, wherein polymerization while supplying the fluorine-containing olefin from the gas phase forms convexities and concavities having heights or depths of several microns to scores of microns on the olefin-contacting surface of the so-formed polymer films.

* * * * *